Patented Apr. 18, 1944

2,346,726

UNITED STATES PATENT OFFICE 2,346,726

PROCESS FOR PREPARING COMPOUNDS OF THE ANTHRAQUINONE SERIES

Edwin C. Buxbaum, Media, Pa., assignor to E. I. du Pont de Nemours & Company, Wilmington, Del., a corporation of Delaware No Drawing. Application December 1, 1942, Serial No. 467,540

5 Claims. (Cl. 260—377)

This invention relates to an improvement in the process for preparing compounds of the anthraquinone series, and more particularly, to an improved process for preparing benzoylaminoanthraquinone from chloroanthraquinones.

While it is known that benzoylaminoanthraquinone compounds may be produced either by the benzoylation of aminoanthraquinone with benzoylchloride or by the reaction of halogenanthraquinones with benzamide, only the first of these processes has been of commercial importance due to the fact that the reaction of benzamide with halogenanthraquinones has heretofore resulted in very low yields of the benzoylaminoanthraquinone compounds of very poor quality. In the main, the prior art has employed the alphabromoanthraquinones for the condensation with benzamide, because the bromine is generally considered to be more readily replaceable than chlorine in the alpha positions. Because of the methods by which the alphachloroanthraquinone compounds may be produced, they are much less expensive than the corresponding amino-derivatives, making them more desirable intermediates for use in the preparation of benzoylaminoanthraquinones provided a satisfactory process can be developed for effecting their condensation with benzamide and the simple substituted benzamides.

It is therefore an object of this invention to provide a simple and economical process for condensing alphachloroanthraquinones with benzamide, whereby the corresponding benzoylaminoanthraquinones of high purity can be obtained in high yields.

By the processes previously disclosed for the condensation of halogenanthraquinones with benzamide, relatively small amounts of copper compounds, such as copper chloride, are employed because in this type of reaction copper has generally been considered only as a catalyst, and therefore it has always been used in comparatively small amounts.

I have found that benzoylaminoanthraquinones of high purity can be produced in high yields directly from alphachloroanthraquinones with benzamide, by carrying out the reaction with comparatively large amounts of cuprous bromide. The cuprous bromide should be employed in an amount equal to from 85% to 115% of the weight of the chloroanthraquinone compound, the preferred amounts being an equal weight of cuprous bromide to the weight of the chloroanthraquinone employed in the condensation. Amounts in excess of 100% add little to the reaction, while quantities over 115% have been found to definitely interfere with the quality of the resulting product. With less than 85%, the yield and quality of the benzoylaminoanthraquinone are materially reduced. The condensation may be carried out at temperatures of from 145° C. to 230° C., although temperatures of from 160° to 175° C. are preferred.

An acid binding agent, such as potassium carbonate, should be employed in the process to the extent of that theoretically required to react with the acid liberated during the condensation. Excesses of from 100% to 200% may be employed without detrimental results.

The following examples are given to illustrate the invention. The parts used are by weight.

Example 1

Sixty parts of benzamide and 60 parts of orthodichlorobenzene are heated together as a melt at 130° C. There is then gradually added, over a period of one-half hour, a previously prepared mixture of 24.2 parts of 1-chloroanthraquinone, 24 parts of potassium carbonate and 24 parts of cuprous bromide. The reaction mass is heated to 170°–175° C. and held at that temperature for ten hours. There is then added 250 parts of orthodichlorobenzene. The diluted condensation mass is held at 170°–175° C. under agitation for an additional three hours and then cooled slowly to room temperature. The resulting crystalline yellow compound is filtered off, washed with alcohol and enough hot 3% hydrochloric acid solution to free it of copper salts. It is then washed acid-free with hot water and dried.

1-benzoylaminoanthraquinone is obtained in yields of over 85% of theory. The product of this example has a melting point of 255° C. and a nitrogen content of 4.29%.

Example 2

Forty parts of benzamide and 40 parts of orthodichlorobenzene are heated together until complete solution results. There is then added a previously prepared mixture of 20 parts of 1,5-dichloroanthraquinone, 20 parts of potassium carbonate and 20 parts of cuprous bromide. The condensation mass is heated at 170°–175° C. for ten hours. It is then diluted with 250 parts of orthodichlorobenzene and held for three hours at 170°–175° C. It is then cooled to room temperature, filtered, and the product washed with a small amount of orthodichlorobenzene. The filter cake is then washed with alcohol, hot water and sufficient hot dilute hydrochloric acid to extract the copper salts. The residue is then washed acid-free and dried.

The crystalline residue on the filter consists of very pure 1,5-dibenzoylaminoanthraquinone. The product, which has a melting point of 390° C. and a nitrogen content of 6.26%, is obtained in nearly theoretical yields.

In the above experiment, if one starts with 1,8-dichloroanthraquinone in place of 1,5-dichloroanthraquinone, the corresponding 1,8-dibenzoylaminoanthraquinone is obtained in pure form and in good yield. In a similar manner, 1,4-dibenzoylaminoanthraquinone can be prepared from 1,4-dichloroanthraquinone.

*Example 3*

Ninety parts of benzamide and 90 parts of orthodichlorobenzene are heated together until solution is complete. There is then added, over a period of one-half hour, a previously prepared mixture of 31 parts of 1,4,5-trichloroanthraquinone, 31 parts of potassium carbonate and 31 parts of cuprous bromide. The condensation mass is heated to 170°–175° C. in one hour and held at that temperature for twelve hours. The reaction mass first turns yellow, then brown and finally violet. When the condensation is completed, the mass is diluted with 250 parts of orthodichlorobenzene, held under agitation at 170°/175° C. for an additional three hours, and then cooled to room temperature. The crystalline violet product is filtered off, washed with a little orthodichlorobenzene and alcohol. It is then washed free of carbonates with hot water and then free of copper salts with hot dilute hydrochloric acid. It is then washed acid-free with hot water and dried. The 1,4,5-tribenzoylaminoanthraquinone, which is a reddish violet powder, is obtained in high yields and is of good quality.

*Example 4*

Forty-six parts of benzamide are dissolved in 46 parts of orthodichlorobenzene at 120°–130° C. When solution is complete, there is added, over a period of one-half hour, a previously prepared mixture of 23 parts of 1,4,5,8-tetrachloroanthraquinone, 23 parts of potassium carbonate and 23 parts of cuprous bromide. The mass is heated to 165°–170° C. and held at that temperature under agitation for ten hours. During the reaction, the color of the mass changes from brown to violet to blue. When the condensation is completed, the mixture is diluted with 250 parts of orthodichlorobenzene, and held at 165°–170° C., under agitation, for an additional three hours. It is then cooled to room temperature. The crystalline product is filtered off and sucked dry, and then steam distilled until free of solvent. The suspension is then acidified with dilute hydrochloric acid until strongly acid to Congo Red paper. It is then boiled gently for 15 minutes, and filtered. The solid is washed acid-free and dried. The crystalline 1,4,5,8-tetrabenzoylaminoanthraquinone is obtained in relatively pure form, having a melting point of 390° C. and a nitrogen content of 8.03%. The yield is over 90% of the theoretical.

As illustrated in the examples, the benzamide is preferably employed in an amount in excess of that theoretically required to completely benzamidate the chloroanthraquinone compound.

In this reaction other solvents than the orthodichlorobenzene may be employed, such as nitrobenzene, trichlorobenzene, diphenyl ether, naphthaline, or any other solvent which will permit the mass to be heated to the temperature required to effect condensation. Orthodichlorobenzene is preferred, because its boiling point coincides with the temperatures that have been found to be satisfactory for carrying out the reaction, and because it is a good solvent for the intermediates employed, and for the benzoylamino compounds produced.

This reaction is suitable for the preparation of the alpha-, mono-, di-, tri- or tetra-benzoylaminoanthraquinones from the corresponding chloroanthraquinones, and for the preparation of the simple substituted derivatives which may be produced by employing a chloro- or methyl-substituted benzamide.

This process permits the economical preparation of the benzoylamino- and simple substituted benzoylaminoanthraquinones, making of commercial importance certain of these dyestuff intermediates that have heretofore been unavailable commercially because of excessive cost of their preparation.

I claim:

1. The process for preparing alpha-benzoylaminoanthraquinones which comprises reacting an alpha-chloroanthraquinone with a compound of the group consisting of benzamide and its nuclear halogen and methyl substitution derivatives in an inert organic solvent in the presence of cuprous bromide in an amount equal to from 85% to 115% of the weight of the chloroanthraquinone compounds employed, and sufficient potassium carbonate to react with the hydrochloric acid liberated in the reaction.

2. The process for preparing alpha-benzoylaminoanthraquinones which comprises reacting an alpha-chloroanthraquinone with benzamide in an inert organic solvent in the presence of cuprous bromide in an amount equal to from 85% to 115% of the weight of the chloroanthraquinone compounds employed, and sufficient potassium carbonate to react with the hydrochloric acid liberated in the reaction.

3. The process for preparing 1,4,5,8-tetrabenzoylaminoanthraquinone which comprises reacting 1,4,5,8-tetrachloroanthraquinone with benzamide in an inert organic solvent in the presence of cuprous bromide in an amount equal to from 85% to 115% of the weight of the tetrachloroanthraquinone employed, and sufficient potassium carbonate to react with the hydrochloric acid liberated in the reaction.

4. The process for preparing 1-benzoylaminoanthraquinone which comprises reacting 1-chloroanthraquinone with benzamide in an inert organic solvent in the presence of cuprous bromide in an amount equal to from 85% to 115% of the weight of the chloroanthraquinone employed, and sufficient potassium carbonate to react with the hydrochloric acid liberated in the reaction.

5. The process for preparing 1,5-di(benzoylamino)-anthraquinone which comprises reacting 1,5-dichloroanthraquinone with benzamide in an inert organic solvent in the presence of cuprous bromide in an amount equal to from 85% to 115% of the weight of the chloroanthraquinone employed, and sufficient potassium carbonate to react with the hydrochloric acid liberated in the reaction.

EDWIN C. BUXBAUM.